(12) United States Patent
Le Quere

(10) Patent No.: US 9,279,528 B2
(45) Date of Patent: Mar. 8, 2016

(54) INSERTION END FITTING FOR A COUPLING OR THE LIKE REQUIRING A LOW PUSH-TOGETHER FORCE

(75) Inventor: Philippe Le Quere, Betton (FR)

(73) Assignee: Parker-Hannifin Manufacturing France, Annemasse (FR)

( * ) Notice: Subject to any disclaimer, the term of this patent is extended or adjusted under 35 U.S.C. 154(b) by 1066 days.

(21) Appl. No.: 13/382,558

(22) PCT Filed: Jun. 29, 2010

(86) PCT No.: PCT/EP2010/059224
§ 371 (c)(1),
(2), (4) Date: Mar. 22, 2012

(87) PCT Pub. No.: WO2011/003779
PCT Pub. Date: Jan. 13, 2011

(65) Prior Publication Data
US 2012/0170973 A1   Jul. 5, 2012

(30) Foreign Application Priority Data
Jul. 8, 2009   (FR) ...................................... 09 03363

(51) Int. Cl.
*F16L 37/091* (2006.01)
*F16B 21/18* (2006.01)
*F16B 21/20* (2006.01)

(52) U.S. Cl.
CPC ............... *F16L 37/091* (2013.01); *F16B 21/18* (2013.01); *F16B 21/20* (2013.01); *Y10T 403/52* (2015.01); *Y10T 403/7075* (2015.01)

(58) Field of Classification Search
CPC ........ F16B 21/18; F16B 21/20; F16L 33/035; F16L 37/091; F16L 37/098
See application file for complete search history.

(56) References Cited

U.S. PATENT DOCUMENTS 4,773,280 A * 9/1988 Baumgarten .................. 403/197
6,780,029 B1 * 8/2004 Gretz .............................. 439/92

(Continued)

FOREIGN PATENT DOCUMENTS

| DE | 10237166 A1 * | 3/2003 |
| DE | 20 2008 002936 | 7/2009 |
| EP | 0378035 | 7/1990 |

(Continued)

OTHER PUBLICATIONS

International Search Report for corresponding patent application No. PCT/EP2010/059224 dated Sep. 9, 2010.

*Primary Examiner* — James Hewitt
(74) *Attorney, Agent, or Firm* — Renner, Otto, Boisselle & Sklar, LLP

(57) ABSTRACT

An insertion endpiece for connecting a part carrying the endpiece with another part provided with a bore for receiving the endpiece. The endpiece is provided with an outer groove in which there is received a cylindrical ring, that is free to turn and to slide. The ring has teeth projecting from its outside surface, the ends of the teeth being contained, in the free state, in a substantially cylindrical envelope of diameter that is greater than the diameter of the bore. The ring is received in the groove while being free to turn and to slide. The axial width (L) of the groove is greater than the axial width (L1) of the ring. When the ring is in abutment against a flank of the groove, the teeth are in register with a secondary groove formed in the bottom of the groove receiving the ring, and into which secondary groove the teeth are capable of penetrating elastically.

6 Claims, 3 Drawing Sheets

(56) References Cited

U.S. PATENT DOCUMENTS 6,957,968 B1 * 10/2005 Gretz ........................ 439/92
7,703,813 B1 * 4/2010 Kiely ..................... 285/139.1
8,415,571 B2 * 4/2013 Kiely et al. ................ 174/669

FOREIGN PATENT DOCUMENTS

| EP | 1591709 | 11/2005 |
| FR | 2102518 | 4/1972 |
| WO | 2007/004859 | 1/2007 |

* cited by examiner

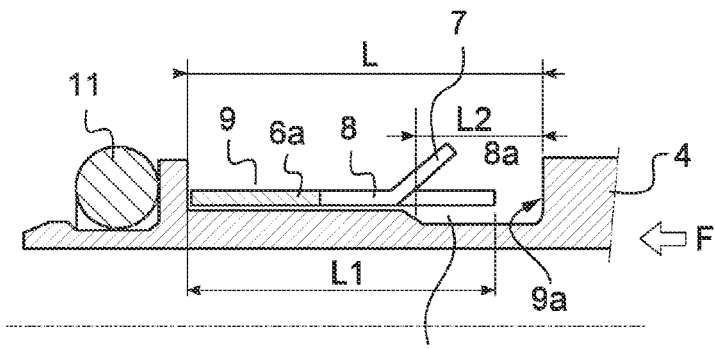
Fig.3A
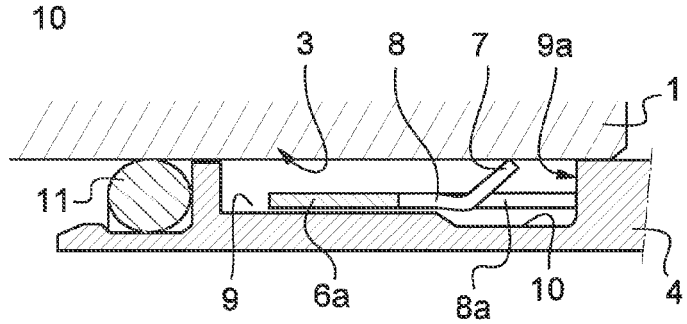
Fig.3B
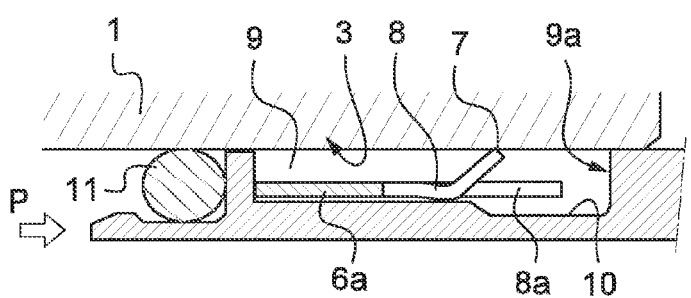
Fig.3C
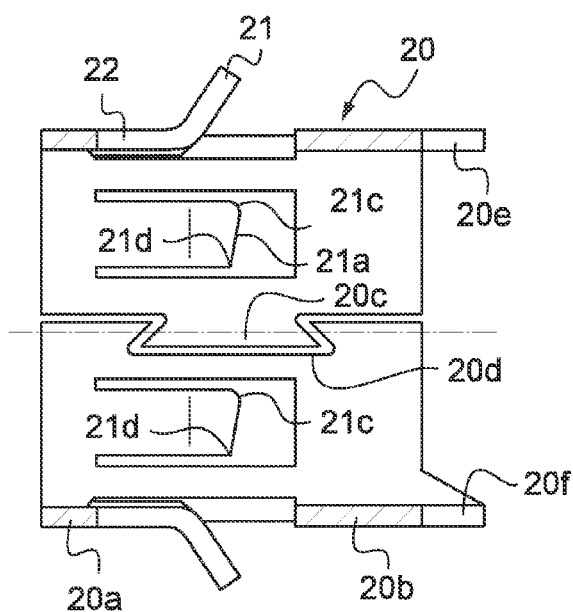
Fig.6
Fig.4

INSERTION END FITTING FOR A COUPLING OR THE LIKE REQUIRING A LOW PUSH-TOGETHER FORCE

The present invention relates to means for making a cylindrical housing or connection well suitable for receiving and retaining in leaktight manner the end of a tube having its inside volume put into communication with a channel that opens out into the bottom of the well.

BACKGROUND OF THE INVENTION

In the pneumatic or hydraulic fields, functional equipment is fed with control or power fluid that is delivered thereto via a tube that needs to be connected in leaktight manner to an internal channel of the equipment. To do this, the body of the equipment is provided with a bore or well that opens out into one of its outside surfaces, and that has the fluid-feed channel terminating in its bottom. The connection means of the tube are for placing in the bore in leaktight manner. The connection means may be embodied in numerous ways on the tube end. On the equipment, there is either a tapped well for making a screw connection with a sleeve that carries the connection members of the tube, or else there is a well in which a sleeve becomes anchored. Anchoring is provided by teeth that are machined on the outside surface of the sleeve and that cooperate with the well after the sleeve has been engaged under force in the well. This engagement requires special tooling for it to be performed, and it gives rise in the engaged parts to permanent stresses and tensions that harm their lifetimes and that can give rise to microcracks leading to a coupling that leaks or indeed to the coupling spontaneously disconnecting.

Attempts have therefore been made to eliminate stresses from this type of connection and to reduce assembly forces. The known solution makes use of an intermediate structure (washer) between the sleeve and the well, which intermediate structure is elastically retractable on being engaged and, under a pull-out force, grips either to the sleeve or to the well by biting into the corresponding surface or by placing the sleeve or the well behind a shoulder that was passed during engagement. That type of connection presents the drawbacks of possessing a radial size that is not negligible, thereby penalizing either the working section for passing fluid through the connection, or else increasing the overall size of the coupling that is to be inserted in the well, which requires wells to be made of greater diameter and thus impeding the provision of a set of couplings arranged side by side on a baseplate of the equipment that is to be fed with fluid.

The beginning of a solution to this problem can be found in document FR 2 102 518. That document discloses an intermediate structure that is not in the form of a toothed washer, but rather in the form of a toothed cylindrical ring, the ring being received in an outer groove of the sleeve that is inserted in the well and biting into the inside surface of the well. The flexibility of the teeth is small and their fastening power is relatively weak.

In addition, that connection cannot be disassembled without destroying at least the toothed ring. In order to enable a gripped-together connection to be disassembled by applying rotation, it is known that the active portions of the teeth need to be given a slope such that the bite mark made by each tooth in the surface that it grips is tangential to a helix lying in the surface, as contrasted to being tangential to a circle lying therein. The major drawback of such gripping and unscrewable connections lies in the fact that they can become unscrewed spontaneously under the effect of axial forces between the two connected-together elements.

The invention provides a solution to each of these presently poorly-solved problems.

SUBJECT MATTER OF THE INVENTION

The invention thus provides an insertion endpiece for connecting a part carrying said endpiece with another part provided with a bore for receiving the endpiece, the endpiece being provided with an outer groove in which there is received a cylindrical ring possessing teeth projecting from its outside surface, the ends of the teeth being contained, in the free state, in a substantially cylindrical envelope of diameter that is greater than the diameter of the bore, the endpiece being characterized in that the ring is received in the groove while being free to turn and to slide, in that the axial width of the groove is greater than the axial width of the ring, and in that when the ring is in abutment against an edge of the groove, the teeth are in register with a secondary groove formed in the bottom of the groove receiving the ring, into which secondary groove the teeth are capable of penetrating elastically.

The edge in question of the groove is the edge against which the ring bears while the two parts are being mutually engaged. It constitutes the flank of the groove that is at the rear in the engagement direction.

The teeth are preferably made as axial tongues cut out in the wall of the ring and having free ends remote from the roots of the teeth that are curved outwards to form spikes enabling the ring to bite into the surface of the bore. The spike is thus carried by a flexible blade, i.e. the tongue, and during engagement it dips resiliently into the secondary groove. The force needed for engagement is then much smaller than it would be if such elastic flexing were not possible.

If an attempt is made to extract the endpiece (either using an external pull-out force, or as a result of pressure becoming established inside the assembly, assuming that the assembly involves tubular parts forming a passage for pressurized fluid), the ring remains attached in the bore and the endpiece slides rearwards. The spring blades of the teeth are then pushed back out from the secondary groove and serves to anchor the teeth in the bore. The radial stiffness of the teeth is then considerably greater than when the teeth were in register with the secondary groove. Anchoring is then extremely firm. The ring is in contact with the front flank of the groove and holds the endpiece anchored in the bore.

According to another characteristic of the invention, one of the flanks of the groove (the rear flank) and the facing end of the ring possess means for putting the ring into rotary abutment in the groove in such a manner that, when the ring is in abutment against said flank, the ring is free to turn relative to the endpiece over an angle of less than 360 degrees.

Naturally, the difference between the axial dimensions of the groove and of the ring are sufficient to enable the abutment means to escape and to enable the ring to rotate completely freely relative to the groove. This applies in particular when the ring bears against the other flank of the groove. The first flank is the flank that is situated at the rear end of the groove in the engagement direction, and the second flank is the front flank.

This set of characteristics enables the assembly to be disassembled by unscrewing providing, in known manner, the ends of the teeth are cut skew so as to bite into the bore at an angle of inclination relative to a generator line of its surface. Thus, rotation between the endpiece and the bore causes each tooth to follow a helix on the inside surface of the bore. It also makes it possible to protect the assembly from accidental disassembly, since when the assembly is in operation, in particular if it is a coupling for pipework carrying fluid, the abutment means are decoupled by being axially moved apart from one each other, because of the freedom of the ring to slide axially in the groove. By way of example, these means may be in the form of a tooth projecting axially from the flank of the groove and a similar tooth projecting from an axial edge of the ring, or else a notch formed in said edge. When designing these angular abutments or indexes, it is necessary to take account of the fact that the engagement force is transmitted from the endpiece to the ring via this flank, in order to ensure that this force does not have the consequence of destroying the above-mentioned abutment means, since such destruction or damage would make it impossible to disassemble the connection by unscrewing it.

Other characteristics and advantages of the invention appear from the description given below of an embodiment of the invention.

BRIEF DESCRIPTION OF THE DRAWINGS

Reference is made to the accompanying drawings, in which:

FIGS. 3A, 3B, and 3C show a sequence of mounting the endpiece of the invention in the bore;

FIG. 4 is an axial half-section showing another assembly ring for the two parts of FIG. 1;

FIG. 6 is a fragmentary diagram of the abutment for enabling the endpiece to apply rotary drive to the ring.

DETAILED DESCRIPTION OF THE INVENTION

Figure 1:
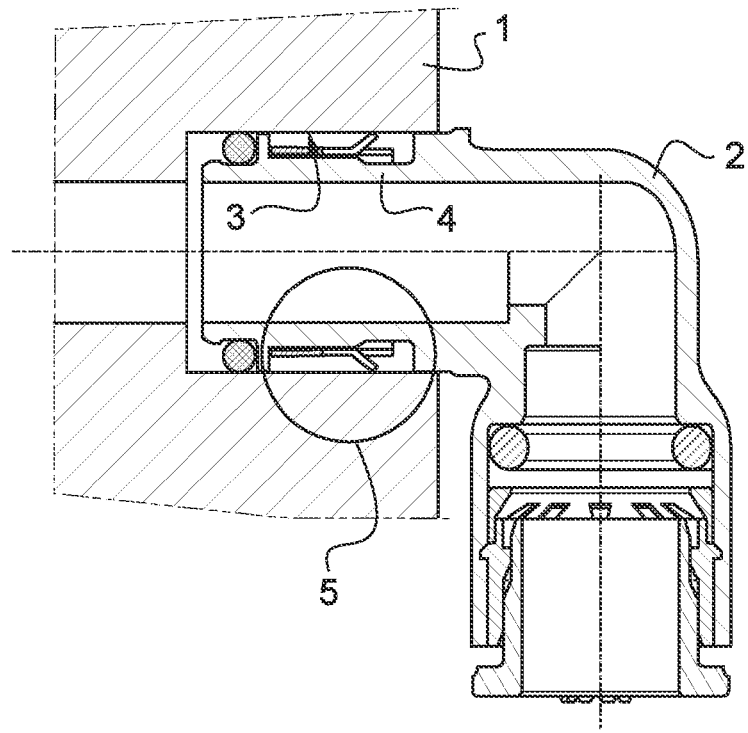
FIG. 1 is a diagram of two parts comprising a bore and an endpiece, the parts being assembled in accordance with the invention.

FIG. 1 shows an assembly of two parts 1 and 2, the part 1 having a bore 3 and the part 2 having an endpiece 4. In this configuration, the part 1 forms part of equipment that consumes fluid under pressure (valve, manifold, actuator, . . . ), and the part 2 is a coupling for a tube (not shown). The coupling is shown in this example as having a bend, but it could have any known configuration.

In FIG. 1, means given overall reference 5 represent the connection of the endpiece 4 in the bore 3, these means together with the endpiece and the bore constituting the subject matter of the invention.

Figure 2:
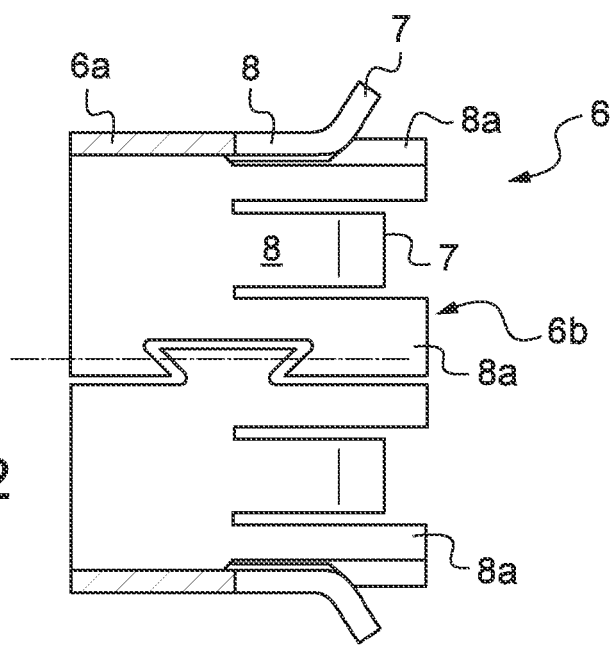
FIG. 2 is an axial half-section showing an assembly ring for the two parts of FIG. 1.
Figure 5A:
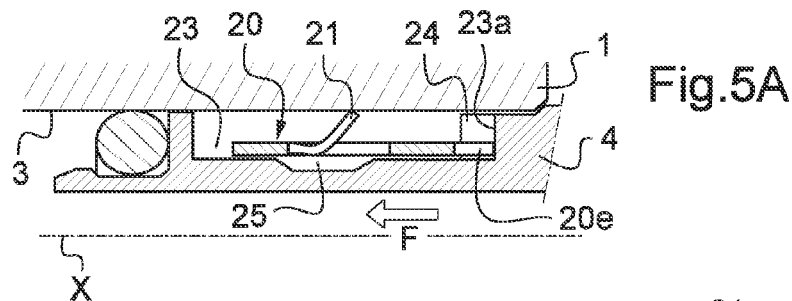
FIGS. 5A to 5D show an assembly-disassembly sequence for the endpiece of the invention fitted with the ring of FIG. 4.
Figure 5B:
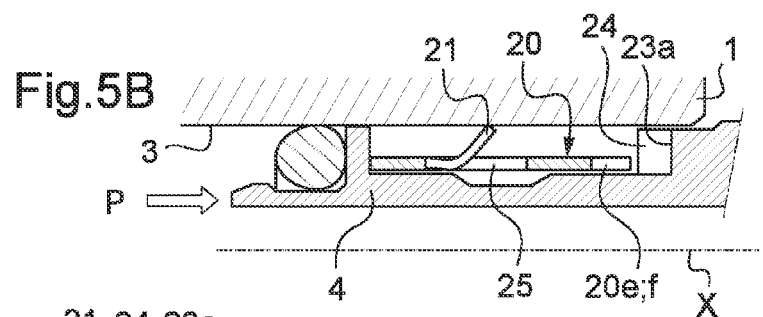
Figure 5C:
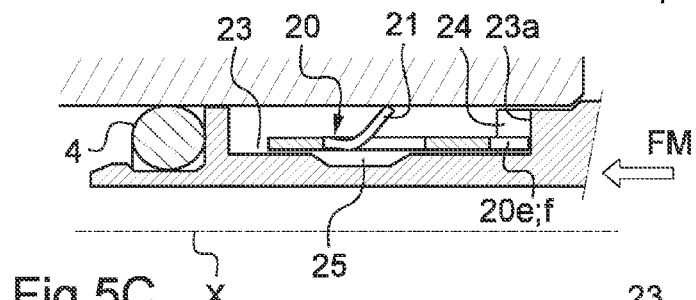
Figure 5D:
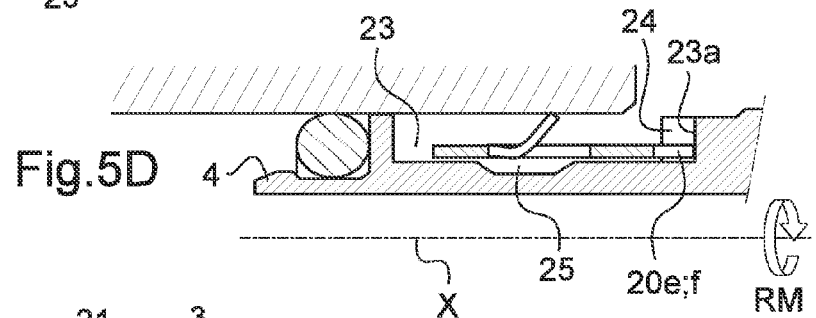

FIGS. 2 and 3A to 3C show an embodiment of the invention in detail. FIG. 2 is an axial section view of a ring 6 that possesses a cylindrical portion 6a and a toothed axial end 6b. Each tooth 7 is formed by the outwardly-curved end of a tongue or blade 8 that is cut out in the wall of the ring 6. Each tooth 7 alternates with a prong 8a that is not curved at its end. The ring 6 is made from cut-out sheet metal that is then rolled up with its ends being fastened together to make a cylinder. In this example, the fastening is performed by a cutout in one end of the sheet-metal segment that co-operates with a cutout of complementary shape in the other end. In the example shown in the figures, the cutout is a male dovetail 6c that is received in a female dovetail 6d, thereby providing great axial and circumferential stiffness to the resulting ring or loop.

The ends are connected together when the sheet is received in an outer groove 9 of the endpiece 4. In this configuration, the ring 6 presents its teeth 7 in a configuration in which their envelope constitutes a cylindrical surface of diameter that is slightly greater than that of the bore 3. Thus, in order to enable the endpiece fitted with its ring 6 to penetrate into the bore, it is necessary to constrain the teeth 7 to move inwards. The invention makes this possible while exerting a force that is moderate, because the bottom of the groove 9 includes a secondary groove 10 into which the tongues 8 can easily flex, since they behave like spring blades, providing the groove 10 is situated under the tongues or blades 8 when they are inserted into the bore 3. This position arises necessarily since, according to the invention, the axial length L of the groove is greater than the axial length L1 of the ring 6, and the secondary groove 10 is situated beside the flank 9a of the groove that constitutes the flank that is at the rear in the direction F in which the endpiece 4 is engaged in the bore 3. Thus, while the endpiece is being engaged in the bore, the ring 6 is entrained towards the flank 9a. The axial length L2 of the secondary groove is sufficient to ensure that, when the straight tongues 8a come into contact with the flank 9a, the tongues 8 carrying the teeth 7 can flex into the groove 10 (see FIG. 3B). There is an abutment to stop movement in the engagement direction, which abutment is not shown.

When the assembly is assembled, as shown in FIG. 3B, pressure can be established in the circuit, and that causes the endpiece to reverse in direction P in FIG. 3C. It should be recalled that in conventional manner the endpiece 4 is provided with a sealing gasket 11 that acts as a piston that is sensitive to the pressure that exists in the circuit. During this movement, the ring 6 is stationary and the flexed tongues 8 are expelled from the secondary groove 10 (which possesses a sloping flank in order to facilitate the sliding of the tongues 8 out from the groove 10), so the teeth 7 bite still more firmly into the wall of the bore 3. The stiffness of each tooth 7 and the associated blade 8 is then considerably increased and the ability of the endpiece to oppose extraction is correspondingly increased.

This configuration enables the endpiece to be engaged in the bore using a force that is small compared with the force that would otherwise need to be developed in the absence of any possibility of the tongues 8 flexing.

FIG. 4 shows a second embodiment of the ring. In this figure it is given reference 20 with teeth 21 formed by the outwardly-curved ends of tongues 22 obtained by being cut out from the wall of the ring 20 in the middle portion thereof. Unlike FIG. 2, the ring carries central teeth that lie between cylindrical portions 20a and 20b. As before, the ring is formed by rolling up a precut piece of sheet metal that is fastened together via dovetail-shaped ends 20c and 20d.

The ring is thus rolled up in a groove 23 of the endpiece 4 that differs from the groove 9 described above by the presence on the rear flanks 23a of said groove of an abutment 24 that is suitable for entraining one of two abutments 20e and 20f forming parts of one of the axial ends of the ring 20. FIG. 6 shows this characteristic. Another difference between the grooves 9 and 23 lies in the position of the secondary groove, here referenced 25. In FIGS. 3A-3C the secondary groove is adjacent to the flank 9a, whereas in FIGS. 5A-5D it is more towards the central portion of the groove 23 so as to accommodate the position of the teeth 21 in the ring 20, and so as to give them the possibility of flexing inwards during engagement.

It should also be observed that the free end 21a of each tooth 21 is skew relative to the general axis X of the assembly. This shape, itself known, serves to obtain a screwing/unscrewing effect for the ring in the bore in which it is engaged. If the ring is turned in the bore, the ends of the teeth of the ring describe respective helixes, thereby enabling relative movement to be obtained between the bore and the ring, and thus the endpiece that it carries, which relative movement includes a component that is axial. In this context, the end edge 21a of each tooth, it should be observed that the corner 21b that is at the front of the tooth in the unscrewing direction is blunted or rounded in order to prevent it from digging into the wall of the bore 3. In contrast, the other corner 21d is much sharper so as to oppose a large force against the ring being screwed into the bore. It is important to ensure that the ring does not screw either spontaneously or accidentally into abutment against the front flank of the groove 23 while the body of the part 1 is at its engagement limit as defined by an abutment on the outside of the part 2 and bearing against the part 1. Under such circumstances, the abutments or dogs 20e and 20f for transferring rotary drive could no longer co-operate with the dog 24 carried by the endpiece 4. During engagement, this situation of the ring 20 being too far away from the flank 23a could result in a most peculiar situation in the event of the top of the drive dog 24 coming to bear against the top of one or other of the abutments 20e or 20f, since the ring would then be permanently out of reach of engaging the endpiece in rotary manner. This risk is practically eliminated by the triangular shape of the dogs 20e, 20f, and 24 visible in FIG. 6, leading to one dog sliding relative to another when axial thrust is applied. It should also be mentioned that the faces of these dogs that co-operate during rotation are axially undercut, thereby ensuring the ring "catches" on the endpiece during rotary drive.

As in the preceding figures, it should also be observed that the axial length of the ring 20 is less than that of the groove 23, such that when the ring is in contact with the flank 23a of the groove, the abutment 20e, 20f lies on the path of the abutment 24 of the endpiece, and can be driven thereby, which makes it possible to unscrew the connection. In contrast, when the ring is remote from the flank 23a, the ring can no longer be made to turn about its axis, so any unscrewing is impossible. However this is a position that is taken up when a pressure P exists in the pipe (see preceding FIGS. 3A-3C). It is thus not possible for the connection to be unscrewed accidentally. Disconnection can be achieved only by applying a manual force FM (FIG. 5C) on the endpiece in the engagement direction and also manual rotation RM (FIG. 5D) so as to cause the ring to be driven by the endpiece via the abutments 20e, 20f, and 24. The abutment means 6a and 24 may be single, or there may be two, three, . . . of them in an angular distribution such that these means can be brought into mutual engagement after turning the endpiece through no more than one free turn (360°) if there is only one lug between the ring and the endpiece.

Figure 7A:
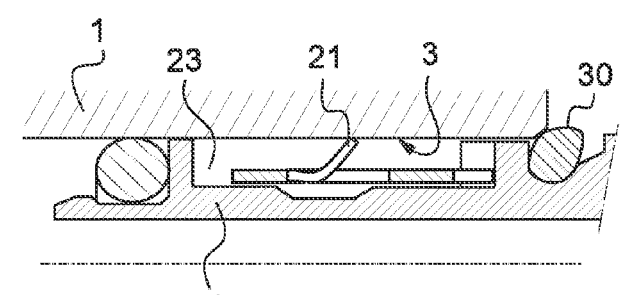
FIGS. 7A and 7B show a variant of the embodiment of FIGS. 5A to 5D.
Figure 7B:
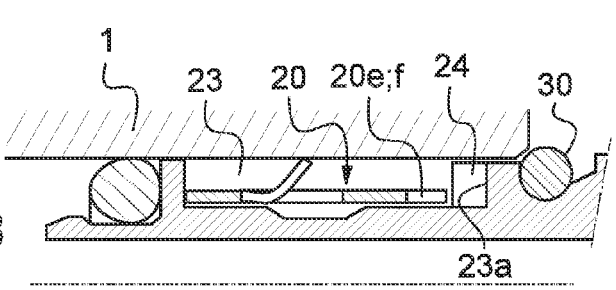

In the variant embodiment shown in FIGS. 7A and 7B, there can be seen all of the elements described above with reference to FIGS. 5A-5D, with the same references. These figures show the presence of an abutment for engaging the endpiece in the bore, which abutment is constituted by an O-ring 30. In FIG. 7A, it can be seen that the O-ring is squeezed at the end of engagement, with the ring 20 coming to bear against the flank 23a of the groove 23. When the engagement force F ceases, the O-ring 30 returns to its initial shape causing the endpiece to move outwards relative to the bore, thereby moving the flank 23a away from the ring 20 and ensuring that the two abutments 24 and 20e, 20f cannot interfere. This provides security against accidental unscrewing even where there is no pressure in the circuit. Furthermore, since the resilient abutment for engagement (30) is preferably constituted by an O-ring, it is very inexpensive to provide and also provides the connection with protection against external pollution.

It should be observed that the embodiment of FIGS. 2 and 3 also lends itself to being unscrewed if the tips of the teeth are skew. The flank 9a of the groove may include a projection suitable for being received between two tongues 8a that are not curved to form teeth.

What is claimed is:

1. An insertion endpiece for connecting a part carrying said endpiece with another part provided with a bore for receiving the endpiece, the endpiece being provided with
   an outer groove in which there is received a cylindrical ring possessing teeth projecting from its outside surface, the ends of the teeth, in a free state, projecting radially outwardly from the outer groove for engaging the bore having a diameter less than the diameter of a substantially cylindrical envelope defined by the ends of the teeth,
   wherein the ring is received in the outer groove while being free to turn and to slide,
   wherein the axial width of the outer groove is greater than the axial width of the ring,
   wherein when the ring is in abutment against a flank of the outer groove, the teeth are in register with a secondary groove formed in the bottom of the outer groove receiving the ring, into which secondary groove the teeth are capable of penetrating elastically,
   wherein the ends of the teeth are cut skew so as to bite into the bore at an angle of inclination relative to a generator line of its surface and
   wherein a first one of the flanks of the groove and the facing end of the ring possess means for putting the ring into rotary abutment in the groove in such a manner that, when the ring is in abutment against said first one of the flanks, the ring is free to turn relative to the endpiece over an angle of less than 360 degrees, and
   wherein the means for putting the ring into rotary abutment include rotary drive abutments, and the endpiece carries an engagement abutment that is elastically deformable in the engagement direction and that, in the absence of axial force between the ring and the endpiece, maintains the ring away from the first one of the flanks of the outer groove so as to prevent any co-operation between the rotary drive abutments.

2. An endpiece according to claim 1, wherein the engagement elastically-deformable abutment is formed by an O-ring that also provides the connection with protection against external pollution.

3. An endpiece according to claim 1, wherein the cylindrical ring is made of cut-out sheet metal that forms a closed loop in the outer groove of the endpiece by co-operation between its ends having cutouts of complementary shapes.

4. An endpiece according to claim 1, wherein the skew ends of the teeth possess front corners in an unscrewing direction that are rounded and rear corners that are sharp.

5. An insertion endpiece for connecting a part carrying said endpiece with another part provided with a bore for receiving the endpiece, the endpiece being provided with
   an outer groove in which there is received a cylindrical ring possessing teeth projecting from its outside surface, the ends of the teeth, in a free state, projecting radially outwardly from the outer groove for engaging the bore having a diameter less than the diameter of a substantially cylindrical envelope defined by the ends of the teeth, wherein the ring is received in the outer groove while being free to turn and to slide, wherein the axial width of the outer groove is greater than the axial width of the ring, wherein when the ring is in abutment against a flank of the outer groove, the teeth are in register with a secondary groove formed in the bottom of the outer groove receiving the ring, into which secondary groove the teeth are capable of penetrating elastically, wherein the ends of the teeth are cut skew so as to bite into the bore at an angle of inclination relative to a generator line of its surface and wherein one of the flanks of the groove and the facing end of the ring possess means for putting the ring into rotary abutment in the groove in such a manner that, when the ring is in abutment against said one of the flanks, the ring is free to turn relative to the endpiece over an angle of less than 360 degrees, wherein the means for putting the ring into rotary abutment include abutments that are of triangular shape with the tips of one set of the abutments facing towards the tips of another set of the abutments.

6. An endpiece according to claim 5, wherein the teeth are made as axial tongues cut out in the wall of the ring and with some teeth having free ends remote from the roots of the teeth that are curved outwards to form spikes enabling the ring to bite into the surface of the bore.

\* \* \* \* \*